United States Patent
Kasahara et al.

(10) Patent No.: US 12,360,356 B2
(45) Date of Patent: Jul. 15, 2025

(54) OPTICAL FILTER DEVICE AND METHOD FOR CONTROLLING OPTICAL FILTER DEVICE

(71) Applicant: HAMAMATSU PHOTONICS K.K., Hamamatsu (JP)

(72) Inventors: Takashi Kasahara, Hamamatsu (JP); Katsumi Shibayama, Hamamatsu (JP); Masaki Hirose, Hamamatsu (JP); Toshimitsu Kawai, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 719 days.

(21) Appl. No.: 17/298,316

(22) PCT Filed: Sep. 30, 2019

(86) PCT No.: PCT/JP2019/038615
§ 371 (c)(1),
(2) Date: May 28, 2021

(87) PCT Pub. No.: WO2020/116006
PCT Pub. Date: Jun. 11, 2020

(65) Prior Publication Data
US 2022/0026703 A1 Jan. 27, 2022

(30) Foreign Application Priority Data
Dec. 5, 2018 (JP) .................................. 2018-228228

(51) Int. Cl.
*G02B 26/00* (2006.01)
*G02B 5/28* (2006.01)

(52) U.S. Cl.
CPC ............. *G02B 26/001* (2013.01); *G02B 5/28* (2013.01)

(58) Field of Classification Search
CPC ........ G02B 26/001; G02B 5/28; G02B 5/284; G01J 3/0256; G01J 3/0264; G01J 3/0297; G01J 3/26
See application file for complete search history.

(56) References Cited

U.S. PATENT DOCUMENTS 5,469,288 A * 11/1995 Onaka ................ G02B 6/29358
398/95
5,589,689 A 12/1996 Koskinen
(Continued)

FOREIGN PATENT DOCUMENTS

JP H10-221661 A 8/1998
JP H10-221669 A 8/1998
(Continued)

OTHER PUBLICATIONS

International Preliminary Report on Patentability issued Jun. 17, 2021 in PCT/2019/038615.

*Primary Examiner* — Balram T Parbadia
*Assistant Examiner* — Gabriel A Sanz
(74) *Attorney, Agent, or Firm* — Faegre Drinker Biddle & Reath LLP (57) ABSTRACT

An optical filter device includes: a Fabry-Perot interference filter that includes: a first structural body having first and second surfaces; a second structural body having a third surface; a first mirror portion provided to the first structural body; a second mirror portion provided to the second structural body so as to face the first mirror portion via an air gap; a first driving electrode provided to the first structural body; a second driving electrode provided to the second structural body; first and third terminals electrically connected to the first driving electrode; and a second terminal
(Continued)

electrically connected to the second driving electrode. A distance between the first driving electrode and the air gap is shorter than a distance between the second surface and the air gap. A resistance measurement unit is electrically connected to the first and third terminals and measures a resistance value of the first driving electrode.

17 Claims, 8 Drawing Sheets

(56) References Cited

U.S. PATENT DOCUMENTS

| | | | |
|---|---|---|---|
| 2004/0125857 A1* | 7/2004 | Sprock | G01K 7/20 |
| | | | 374/185 |
| 2008/0043315 A1* | 2/2008 | Cummings | G02B 26/001 |
| | | | 359/290 |
| 2008/0062426 A1 | 3/2008 | Yoshida | |
| 2012/0133947 A1* | 5/2012 | Nozawa | G02B 26/001 |
| | | | 356/450 |
| 2016/0357009 A1* | 12/2016 | Shibayama | G02B 26/001 |
| 2018/0164581 A1 | 6/2018 | Hakvoort et al. | |
| 2019/0277703 A1* | 9/2019 | Valouch | G01J 5/04 |

FOREIGN PATENT DOCUMENTS

| | | |
|---|---|---|
| JP | 2011-053510 A | 3/2011 |
| JP | 2012-113133 A | 6/2012 |
| JP | 2015-011311 A | 1/2015 |
| JP | 2015-011312 A | 1/2015 |
| JP | 2017-161336 A | 9/2017 |
| JP | 2018-010038 A | 1/2018 |
| JP | 2018-077257 A | 5/2018 |
| JP | 2018-156112 A | 10/2018 |
| JP | 2018-189775 A | 11/2018 |
| TW | 201735330 A | 10/2017 |
| WO | WO 2015/064749 A1 | 5/2015 |
| WO | WO 2017/203949 A1 | 11/2017 |
| WO | WO-2018/216527 A1 | 11/2018 |

* cited by examiner

OPTICAL FILTER DEVICE AND METHOD FOR CONTROLLING OPTICAL FILTER DEVICE

TECHNICAL FIELD

An aspect of the present disclosure relates to an optical filter device comprising a Fabry-Perot interference filter and a method for controlling such an optical filter device.

BACKGROUND ART

There is known a Fabry-Perot interference filter including a pair of structural bodies facing each other via an air gap and a pair of mirror portions provided in the pair of structural bodies respectively and facing each other via the air gap (for example, see Patent Literature 1). In such a Fabry-Perot interference filter, the distance between the mirror portions is adjusted by an electrostatic force corresponding to an applied voltage so that light having a desired wavelength is transmitted.

CITATION LIST

Patent Literature

Patent Literature 1: Japanese Unexamined Patent Publication No. 2012-113133

SUMMARY OF INVENTION

Technical Problem

In the Fabry-Perot interference filter as described above, the transmission wavelength changes in accordance with the environmental temperature. Therefore, for example, when high wavelength accuracy is required, it is necessary to adjust the applied voltage in accordance with the environmental temperature. In the Fabry-Perot interference filter described in Patent Literature 1, a temperature sensor such as a thermistor is provided on an outer surface, and the temperature of the Fabry-Perot interference filter is measured. The applied voltage is adjusted based on the measured temperature.

On the other hand, the size of the Fabry-Perot interference filter is extremely important. However, in the related art, since an arrangement space for the temperature sensor, the wiring thereof, and the like is required, there is a concern that it is difficult to reduce the size.

Therefore, it is an object of an aspect of the present disclosure to provide an optical filter device capable of accurately grasping the temperature of the Fabry-Perot interference filter and reducing the size of the Fabry-Perot interference filter, and a method for controlling an optical filter device capable of achieving high wavelength accuracy even when the environmental temperature changes.

Solution to Problem

An optical filter device according to an aspect of the present disclosure includes: a Fabry-Perot interference filter; and a resistance measurement unit electrically connected to the Fabry-Perot interference filter. The Fabry-Perot interference filter includes: a first structural body having a first surface and a second surface opposite the first surface; a second structural body having a third surface facing the first surface via an air gap; a first mirror portion provided to the first structural body; a second mirror portion provided to the second structural body so as to face the first mirror portion via the air gap, a distance between the first mirror portion and the second mirror portion in a light transmission region being adjusted; a first driving electrode provided to the first structural body; a second driving electrode provided to the second structural body so as to face the first driving electrode via the air gap; a first terminal electrically connected to the first driving electrode; a second terminal electrically connected to the second driving electrode; and a third terminal electrically connected to the first driving electrode. The first driving electrode overlaps the air gap when viewed from a facing direction in which the first surface and the third surface face each other. A distance between the first driving electrode and the air gap in the facing direction is shorter than a distance between the second surface and the air gap in the facing direction. The resistance measurement unit is electrically connected to the first terminal and the third terminal and measures a resistance value of the first driving electrode In this optical filter device, for example, the distance between the first mirror portion and the second mirror portion can be adjusted by applying a voltage or a current between the first terminal and the second terminal. In this optical filter device, the resistance value of the first driving electrode provided to the first structural body is measured by the resistance measurement unit. Since the resistance value of the first driving electrode changes in accordance with the temperature, the temperature of the Fabry-Perot interference filter can be grasped based on the measured resistance value. Here, in this optical filter device, the first driving electrode overlaps the air gap when viewed from the facing direction, and the distance between the first driving electrode and the air gap in the facing direction is shorter than the distance between the second surface and the air gap in the facing direction. The transmission wavelength of the Fabry-Perot interference filter is determined by the thickness of the air gap (in other words, the distance between the first mirror portion and the second mirror portion). Therefore, the temperature of the Fabry-Perot interference filter can be accurately grasped by using the resistance value of the first driving electrode disposed near the air gap. Furthermore, in this optical filter device, since the temperature of the Fabry-Perot interference filter can be grasped based on the resistance value of the first driving electrode, it is not necessary to provide a temperature sensor, wiring thereof, and the like as in the related art described above. As a result, the Fabry-Perot interference filter can be downsized. Therefore, according to the optical filter device, the temperature of the Fabry-Perot interference filter can be accurately grasped, and the Fabry-Perot interference filter can be downsized.

The first structural body may be a layered body, and the first driving electrode may be an impurity region in a semiconductor layer constituting the layered body. In this case, since the first driving electrode is configured by the semiconductor layer in which the change in the resistance value in accordance with the temperature is large, it is possible to more accurately grasp the temperature of the Fabry-Perot interference filter. Furthermore, the degree of freedom in design of at least one of the arrangement and characteristics of the first driving electrode can be improved.

The first driving electrode may overlap the light transmission region when viewed from the facing direction, and may constitute the first mirror portion. In this case, the first driving electrode can be disposed near the air gap between the first mirror portion and the second mirror portion, and the temperature of the Fabry-Perot interference filter can be grasped more accurately.

The first driving electrode may be exposed to the air gap. In this case, the first driving electrode can be disposed closer to the air gap, and the temperature of the Fabry-Perot interference filter can be grasped more accurately.

The first terminal and the third terminal may be provided to the first structural body so as to face each other with the light transmission region interposed therebetween when viewed from the facing direction. In this case, the distance between the first terminal and the third terminal via the first driving electrode can be increased, and the change in the resistance value of the first driving electrode in accordance with the temperature can be increased. As a result, the temperature of the Fabry-Perot interference filter can be grasped more accurately.

The first mirror portion may be a movable mirror that is movable with respect to the second mirror portion, and the second mirror portion may be a fixed mirror whose position is fixed. In this case, the temperature of the Fabry-Perot interference filter can be grasped more accurately.

The optical filter device according to one aspect of the present disclosure may further include a package that accommodates the Fabry-Perot interference filter, and the resistance measurement unit may be disposed in the package. In this case, the optical filter device can be downsized.

The optical filter device according to an aspect of the present disclosure may further include a package that accommodates the Fabry-Perot interference filter, the package may include a stein and a cap provided with a light incident portion, and the Fabry-Perot interference filter may be fixed to the stein in a state of being separated from the stem. In this case, it is possible to suppress the influence of heat on the Fabry-Perot interference filter via the stein.

The optical filter device according to an aspect of the present disclosure may further include a first external terminal electrically connected to the first terminal, and a second external terminal electrically connected to the second terminal. In this case, for example, the distance between the first driving electrode and the second driving electrode can be adjusted by applying a voltage or a current between the first external terminal and the second external terminal.

An optical filter device according to an aspect of the present disclosure includes: Fabry-Perot interference filter; and a first external terminal, a second external terminal, and a third external terminal electrically connected to the Fabry-Perot interference filter. The Fabry-Perot interference filter includes: a first structural body having a first surface and a second surface opposite the first surface; a second structural body having a third surface facing the first surface via an air gap; a first mirror portion provided to the first structural body; a second mirror portion provided to the second structural body so as to face the first mirror portion via the air gap, a distance between the first mirror portion and the second mirror portion in a light transmission region being adjusted; a first driving electrode provided to the first structural body; a second driving electrode provided to the second structural body so as to face the first driving electrode via the air gap; a first terminal electrically connected to the first driving electrode; a second terminal electrically connected to the second driving electrode; and a third terminal electrically connected to the first driving electrode. The first driving electrode overlaps the air gap when viewed from a facing direction in which the first surface and the third surface face each other. A distance between the first driving electrode and the air gap in the facing direction is shorter than a distance between the second surface and the air gap in the facing direction. The first external terminal is electrically connected to the first terminal. The second external terminal is electrically connected to the second terminal. The third external terminal is electrically connected to the third terminal.

In this optical filter device, for example, the distance between the first mirror portion and the second mirror portion can be adjusted by applying a voltage or a current between the first external terminal and the second external terminal. Further, the resistance value of the first driving electrode can be measured via the first external terminal and the third external terminal, and the first terminal and the third terminal. Therefore, for the reasons described above, the temperature of the Fabry-Perot interference filter can be accurately grasped, and the Fabry-Perot interference filter can be downsized.

The optical filter device according to an aspect of the present disclosure may further include a resistance measurement unit electrically connected to the first external terminal and the third external terminal and measuring a resistance value of the first driving electrode via the first terminal and the third terminal. In this case, the resistance measurement unit can measure the resistance value of the first driving electrode via the first external terminal and the third external terminal, and the first terminal and the third terminal.

The optical filter device according to an aspect of the present disclosure may further include a package that accommodates the Fabry-Perot interference filter, and the resistance measurement unit may be disposed outside the package. In this case, the size of the package can be reduced.

According to an aspect of the present disclosure, there is provided a method for controlling an optical filter device including a Fabry-Perot interference filter. The Fabry-Perot interference filter includes: a first structural body having a first surface and a second surface opposite the first surface; a second structural body having a third surface facing the first surface via an air gap; a first mirror portion provided to the first structural body; a second mirror portion provided to the second structural body so as to face the first mirror portion via the air gap, a distance between the first mirror portion and the second mirror portion in a light transmission region being adjusted; a first driving electrode provided to the first structural body; a second driving electrode provided to the second structural body so as to face the first driving electrode via the air gap; a first terminal electrically connected to the first driving electrode; a second terminal electrically connected to the second driving electrode; and a third terminal electrically connected to the first driving electrode. The first driving electrode overlaps the air gap when viewed from a facing direction in which the first surface and the third surface face each other. A distance between the first driving electrode and the air gap in the facing direction is shorter than a distance between the second surface and the air gap in the facing direction. The method for controlling the optical filter device includes: a first step of measuring a resistance value of the first driving electrode via the first terminal and the third terminal; and a second step of adjusting a voltage or a current applied between the first terminal and the second terminal based on the resistance value measured in the first step.

In this method for controlling an optical filter device, the resistance value of the first driving electrode is measured via the first terminal and the third terminal, and the voltage or current applied between the first terminal and the second terminal is adjusted based on the measured value. As described above, the temperature of the Fabry-Perot interference filter can be accurately grasped by using the resistance value of the first driving electrode. Therefore, by adjusting the voltage or current based on the resistance value of the first driving electrode, high wavelength accuracy can be realized even when the environmental temperature changes.

Advantageous Effects of Invention

According to an aspect of the invention, it is possible to provide an optical filter device capable of accurately grasping the temperature of a Fabry-Perot interference filter and reducing the size of the Fabry-Perot interference filter, and a method for controlling an optical filter device capable of achieving high wavelength accuracy even when the environmental temperature changes.

DESCRIPTION OF EMBODIMENTS

Hereinafter, an embodiment of the present disclosure will be described in detail with reference to the drawings. In the following description, the same reference numerals are used for the same or corresponding element, and redundant description is omitted.

[Configuration of Spectroscopic Sensor]

Figure 1:
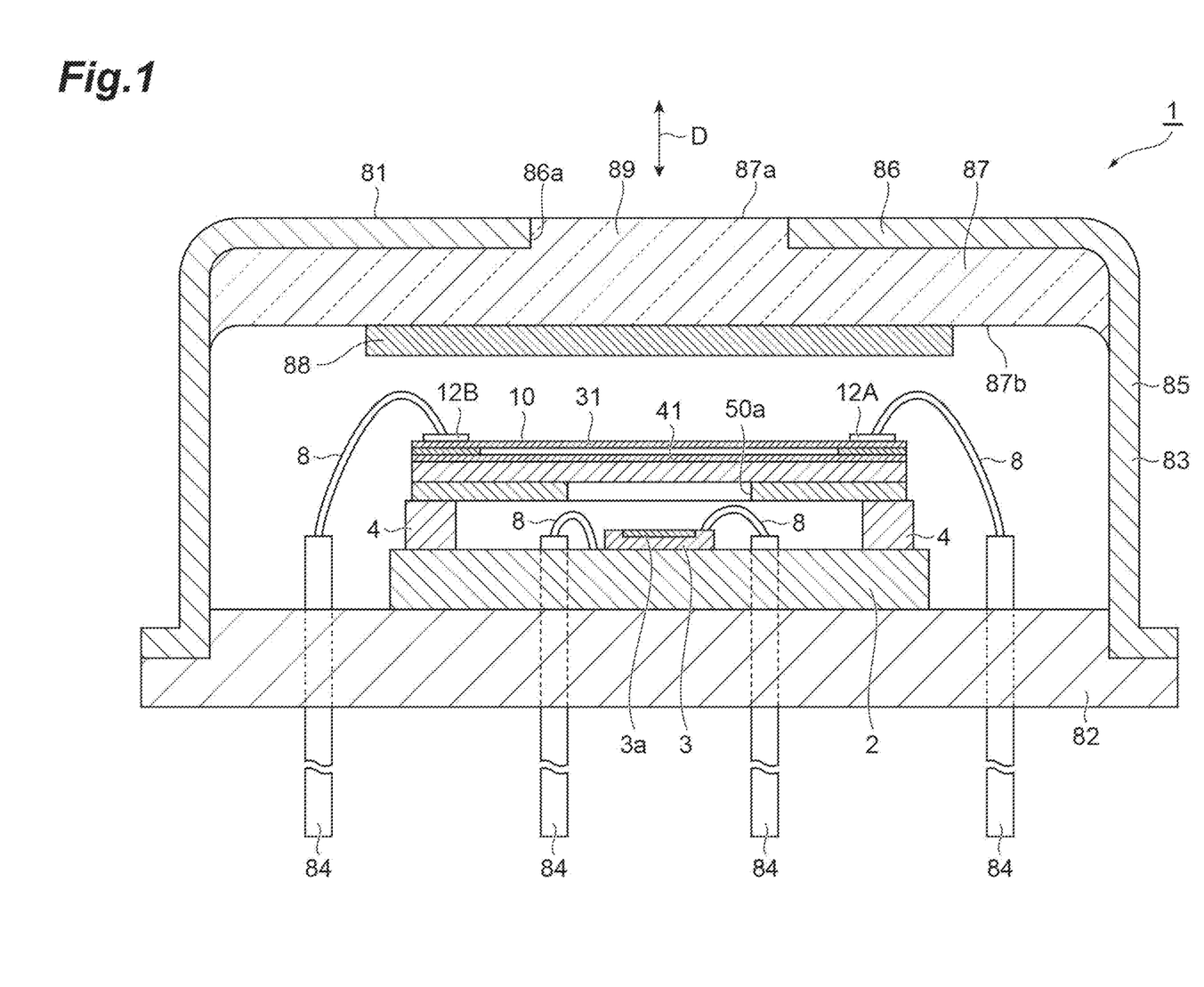
FIG. 1 is a cross-sectional view of the spectroscopic sensor according to the embodiment.
Figure 2:
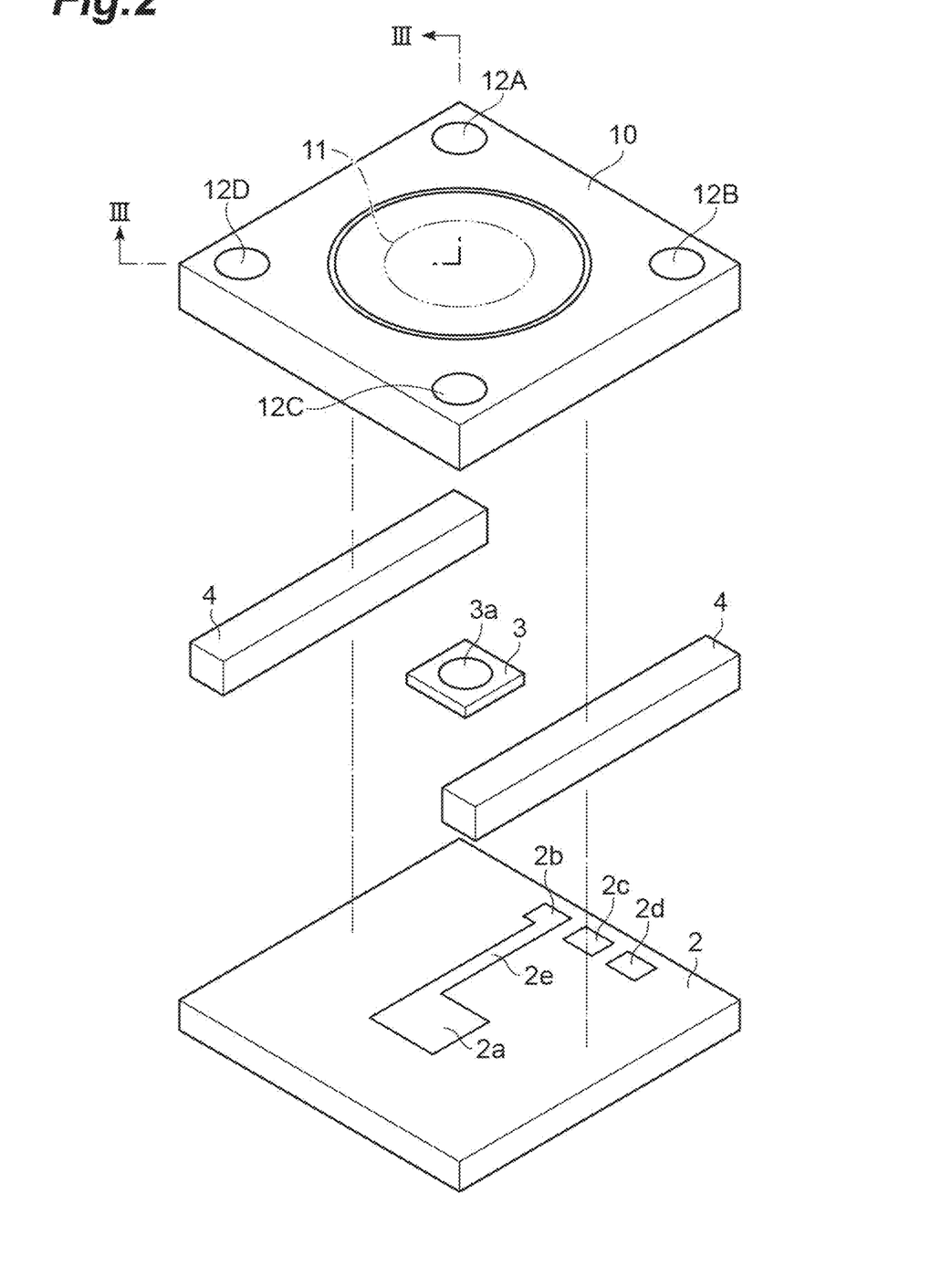
FIG. 2 is an exploded perspective view of a part of the spectroscopic sensor.

As shown in FIGS. 1 and 2, the spectroscopic sensor (optical filter device, photodetector device) 1 includes a wiring substrate 2, a photodetector 3, a plurality of spacers 4, and a Fabry-Perot interference filter 10. The Fabry-Perot interference filter 10 includes a first mirror portion 31 and a second mirror portion 41 whose distance from each other is variable. The Fabry-Perot interference filter 10 transmits light having a wavelength corresponding to the distance between the first mirror portion 31 and the second mirror portion 41. The Fabry-Perot interference filter 10 is provided with an opening 50a through which the light passes along a facing direction D in which the first mirror portion 31 and the second mirror portion 41 face each other.

The photodetector 3 includes a light receiving portion 3a that receives light having passed through the opening 50a. The light receiving portion 3a faces the opening 50a in the facing direction D. The photodetector 3 is, for example, an infrared detector. As the infrared detector, a quantum sensor using InGaAs or the like or a thermal sensor using a thermopile, a bolometer, or the like can be used. When ultraviolet (UV), visible, and near-infrared regions are detected, a silicon photodiode or the like can be used as the photodetector 3. The photodetector 3 may have one light receiving portion 3a or a plurality of light receiving portions 3a arranged in an array. A plurality of photodetectors 3 may be mounted on the wiring substrate 2.

The photodetector 3 is mounted on the wiring substrate 2. More specifically, the wiring substrate 2 is provided with a mounting portion 2a on which the photodetector 3 is mounted and a plurality of electrode pads 2b, 2c, and 2d. The electrode pad 2b is electrically connected to the mounting portion 2a via a wiring 2e. The wiring substrate 2 is made of, for example, silicon, quartz, glass, ceramic, plastic, glass epoxy material, or the like.

The plurality of spacers (supports) 4 are fixed on the wiring substrate 2. The spacers 4 support the Fabry-Perot interference filter 10 from the light emitting side (the side of the second layered body 40 described later). The spacers 4 are made of, for example, silicon, ceramic, quartz, glass, plastic, or the like. The spacer 4 may be formed integrally with the wiring substrate 2. In this case, a member constituted by the wiring substrate 2 and the spacer 4 serves as a support that supports the Fabry-Perot interference filter 10. The spacer 4 may be formed integrally with the Fabry-Perot interference filter 10. The Fabry-Perot interference filter 10 may be supported by one spacer 4.

The spectroscopic sensor 1 further includes a CAN package (package) 81 that accommodates the wiring substrate 2, the photodetector 3, the plurality of spacers 4, and the Fabry-Perot interference filter 10. The CAN package 81 includes a stein 82 and a cap 83. The stein 82 and the cap 83 are made of metal, for example, and are airtightly joined to each other.

The cap 83 is integrally constituted by a side wall 85 and a top wall 86. An opening 86a is formed in the top wall 86. A light transmitting member 87 is disposed on the inner surface of the top wall 86 so as to close the opening 86a. The light transmitting member 87 reaches the inside of the opening 86a and the inner surface of the side wall 85, and hermetically seals the opening 86a. When viewed from the facing direction D, the outer edge of the light transmitting member 87 is located outside the outer edge of the Fabry-Perot interference filter 10. The light incident surface 87a of the light transmitting member 87 is substantially flush with the outer surface of the top wall 86 at the opening 86a. The light transmission member 87 transmits at least light in the measurement wavelength range of the spectroscopic sensor 1. A portion of the light transmitting member 87 located in the opening 86a functions as a light incident portion 89 that allows light to enter the CAN package 81 from the outside. The light transmitting member 87 is made of, for example, fused glass. A plate-shaped band-pass filter 88 is coupled to the light emission surface 87b of the light transmission member 87. The bandpass filter 88 selectively transmits light in the measurement wavelength range of the spectroscopic sensor 1. Since the outer edge of the light transmitting member 87 is located outside the outer edge of the Fabry-Perot interference filter 10, the heat capacity of the light transmitting member 87 and the thermal connection area between the light transmitting member 87 and the CAN package 81 can be increased. As a result, the temperature of the CAN package 81 can be made uniform. The light incident surface 87a of the light transmitting member 87 may have a concave shape recessed toward the Fabry-Perot interference filter 10 side with respect to the outer surface of the top wall 86 in the opening 86a.

The wiring substrate 2 is fixed on the stein 82. That is, the spacers 4 support the Fabry-Perot interference filter 10, on the stein 82. Accordingly, the Fabry-Perot interference filter 10 is fixed to the stein 82 in a state of being spaced apart from the stein 82. The photodetector 3 is disposed in a space formed between the wiring substrate 2 and the Fabry-Perot interference filter 10 by the plurality of spacers 4. The electrode pads 2b and 2c of the wiring substrate 2, the terminals of the photodetector 3, and the terminals 12A to 12D of the Fabry-Perot interference filter 10 are electrically connected to a plurality of lead pins 84 penetrating the stein 82 via wires 8, respectively. As a result, input and output of electric signals to and from the photodetector 3 and the Fabry-Perot interference filter 10 are performed. The details of the electrical connection of each unit will be described later.

In the spectroscopic sensor 1 configured as described above, when measurement light is incident on the Fabry-Perot interference filter 10 from the outside via the light incident portion 89, light having a predetermined wavelength is transmitted through the first mirror portion 31 and the second mirror portion 41 in accordance with the distance between the first mirror portion 31 and the second mirror portion 41. The light transmitted through the first mirror portion 31 and the second mirror portion 41 passes through the opening 50a, enters the light receiving portion 3a of the photodetector 3, and is detected by the photodetector 3. In the spectroscopic sensor 1, for example, while the voltage applied to the Fabry-Perot interference filter 10 is changed (that is, while the distance between the first mirror portion 31 and the second mirror portion 41 is changed), the light transmitted through the Fabry-Perot interference filter 10 is detected by the photodetector 3, and thus the spectroscopic spectrum can be obtained.

[Configuration of Fabry-Perot Interference Filter]

Figure 3:
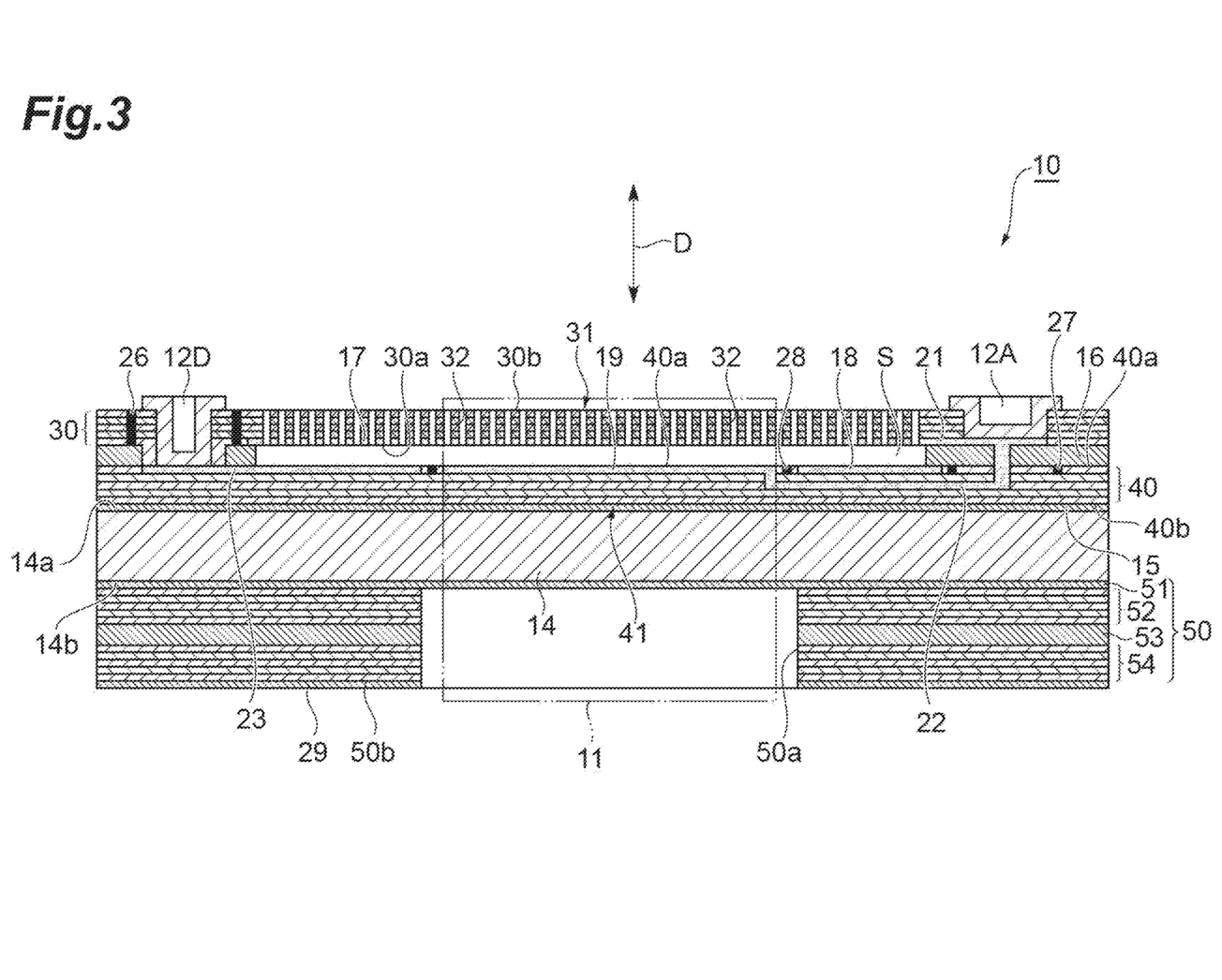
FIG. 3 is a cross-sectional view of the Fabry-Perot interference filter taken along line III-III of FIG. 2.

As shown in FIG. 3, the Fabry-Perot interference filter 10 includes a substrate 14. An anti-reflection layer 15, a second layered body (second structural body) 40, an intermediate layer 16, and a first layered body (first structural body) 30 are stacked in this order on a surface 14a of the substrate 14 on the light incident side. An air gap S is formed between the first layered body 30 and the second gap 40 by the frame-shaped intermediate layer 16. That is, the first layered body 30 and the second layered body 40 are supported by the substrate 14. More specifically, the second layered body 40 is disposed on the surface 14a of the substrate 14 via the anti-reflection layer 15, and the first layered body 30 is disposed on the second layered body 40 via the intermediate layer 16.

In the Fabry-Perot interference filter 10, the measurement light is incident on the first layered body 30 from the side opposite to the substrate 14. The Fabry-Perot interference filter 10 transmits light having a predetermined wavelength in a light transmission region 11 defined in a central portion thereof. The light transmission region 11 is, for example, a cylindrical region. The substrate 14 is made of, for example, silicon, quartz, or glass. When the substrate 14 is made of silicon, the anti-reflection layer 15 and the intermediate layer 16 are made of, for example, silicon oxide.

The first layered body 30 has a first surface 30a and a second surface 30b opposite to the first surface 30a. The first surface 30a and the second surface 30b are flat surfaces perpendicular to the facing direction D, for example. A portion of the first layered body 30 corresponding to the light transmission region 11 (a portion overlapping the light transmission region 11 when viewed from the facing direction D) functions as the first mirror portion 31. That is, the first mirror portion 31 is provided in the first layered body 30. The first mirror portion 31 is a movable mirror that is movable with respect to the second mirror portion 41. For example, the first layered body 30 is formed by alternately stacking a plurality of polysilicon layers (semiconductor layers) and a plurality of silicon nitride layers (semiconductor layers) one by one. The optical thickness of each of the polysilicon layer and the silicon nitride layer constituting the first mirror portion 31 is preferably an integral multiple of ¼ of the center transmission wavelength.

The second layered body 40 has a third surface 40a facing the first surface 30a of the first layered body 30 via the air gap S, and a fourth surface 40b opposite to the third surface 40a. The third surface 40a and the fourth surface 40b are flat surfaces perpendicular to the facing direction D, for example. A portion of the second layered body 40 corresponding to the light transmission region 11 (a portion overlapping the light transmission region 11 when viewed from the facing direction D) functions as the second mirror portion 41. That is, the second mirror portion 41 is provided in the second layered body 40. The second mirror portion 41 is a fixed mirror whose position is fixed. The second mirror portion 41 is disposed between the first mirror portion 31 and the substrate 14, and faces the first mirror portion 31 via the air gap S. For example, the second layered body 40 is formed by alternately stacking a plurality of polysilicon layers and a plurality of silicon nitride layers one by one. The optical thickness of each of the polysilicon layer and the silicon nitride layer constituting the second mirror portion 41 is preferably an integral multiple of ¼ of the central transmission wavelength.

In the first layered body 30 and the second layered body 40, a silicon oxide layer may be used instead of the silicon nitride layer. As a material of each layer constituting the first layered body 30 and the second layered body 40, titanium dioxide, tantalum oxide, zirconium oxide, magnesium fluoride, aluminum oxide, calcium fluoride, silicon, germanium, zinc sulfide, or the like may be used.

A plurality of through holes 32 are formed in a portion of the first layered body 30 corresponding to the air gap S (a portion overlapping the air gap S when viewed from the facing direction D). The through holes 32 extend from the second surface 30b of the first layered body 30 to the air gap S. The through holes 32 are formed so as not to substantially affect the function of the first mirror portion 31. The through holes 32 may be used to form the air gap S by removing a part of the intermediate layer 16 by etching.

A first driving electrode 17 is provided in the first layered body 30. The first driving electrode 17 has, for example, a circular shape and overlaps the air gap S, when viewed from the facing direction D. In this example, the first driving electrode 17 overlaps the light transmission region 11 when viewed from the facing direction D, and constitutes the first mirror portion 31. The first driving electrode 17 is formed in a layer (polysilicon layer) in contact with the intermediate layer 16 among the plurality of layers constituting the first layered body 30, and is exposed to the air gap S. The distance (shortest distance) between the first driving electrode 17 and the air gap S in the facing direction D is shorter than the distance (shortest distance) between the second surface 30b and the air gap S in the facing direction D. In this example, the distance between the first driving electrode 17 and the air gap S in the facing direction D is zero, and the distance between the second surface 30b and the air gap S in the facing direction D is equal to the thickness of the first layered body 30. The distance between the first driving electrode 17 and the air gap S in the facing direction D is shorter than the distance between the first driving electrode 17 and the second surface 30b in the facing direction D. The first driving electrode 17 is formed by, for example, doping the polysilicon layer with impurities to reduce the resistance. That is, in this example, the first driving electrode 17 is an impurity region in the polysilicon layer.

The second layered body 40 is provided with a second driving electrode 18 and a compensation electrode 19. The second driving electrode 18 has, for example, an annular shape and surrounds the light transmission region 11, and overlaps the air gap S, when viewed from the facing direction D. The second driving electrode 18 faces the first driving electrode 17 via the air gap S. The second driving electrode 18 is formed in a layer (polysilicon layer) in contact with the intermediate layer 16 among the plurality of layers constituting the second layered body 40, and is exposed to the air gap S. The distance (shortest distance) between the second driving electrode 18 and the air gap S in the facing direction D is shorter than the distance (shortest distance) between the fourth surface 40b and the air gap S in the facing direction D. In this example, the distance between the second driving electrode 18 and the air gap S in the facing direction D is zero, and the distance between the fourth surface 40b and the air gap S in the facing direction D is equal to the thickness of the first layered body 30. The distance between the second driving electrode 18 and the air gap S in the facing direction D is shorter than the distance between the second driving electrode 18 and the fourth surface 40b in the facing direction D. The second driving electrode 18 is formed by, for example, doping the polysilicon layer with impurities to reduce the resistance. That is, in this example, the second driving electrode 18 is an impurity region in the polysilicon layer.

The compensation electrode 19 has, for example, a circular shape and overlaps the light transmission region 11, when viewed from the facing direction D. The size of the compensation electrode 19 includes the entire light transmission region 11, but may be substantially the same as the size of the light transmission region 11. The compensation electrode 19 faces the first driving electrode 17 via the air gap S. The compensation electrode 19 is formed in a layer (polysilicon layer) which is in contact with an intermediate layer among the plurality of layers constituting the second layered body 40, and is exposed to the air gap S. The distance between the compensation electrode 19 and the air gap S in the facing direction D is shorter than the distance between the fourth surface 40b and the air gap S in the facing direction D. The compensation electrode 19 constitutes a second mirror portion 41. The compensation electrode 19 is formed by, for example, doping the polysilicon layer with impurities to reduce the resistance.

The first layered body 30 is provided with a first terminal 12A, a second terminal 12B, a third terminal 12C, and a fourth terminal 12D. Each of the terminals 12A to 12D is disposed outside the light transmission region 11 and the air gap S when viewed from the facing direction D. Each of the terminals 12A to 12D is formed of a metallic film such as aluminum or an alloy thereof. The first terminal 12A and the third terminal 12C face each other across the light transmission region 11 when viewed from the facing direction D, and the second terminal 12B and the fourth terminal 12D face each other across the light transmission region 11 when viewed from the facing direction D. The direction in which the first terminal 12A and the third terminal 12C face each other is, for example, orthogonal to the direction in which the second terminal 12B and the fourth terminal 12D face each other (see FIG. 2).

The first terminal 12A and the third terminal 12C have the same configuration. Each of the terminals 12A and 12C is disposed in a through hole extending from the second surface 30b to the intermediate portion in the first layered body 30. Each of the terminals 12A and 12C is electrically connected to the first driving electrode 17 via the wiring portion 21, and is electrically connected to the compensation electrode 19 via the wiring portion 22. The wiring portions 21 and 22 are formed by, for example, doping the polysilicon layer with impurities to reduce the resistance.

The second terminal 12B and the fourth terminal 12D have the same configuration. Each of the terminals 12B and 12D is disposed in a through hole extending from the second surface 30b of the first layered body 30 to the second layered body 40. The terminals 12B and 12D are electrically connected to the second driving electrode 18 via the wiring portion 23. The wiring portion 23 is formed by, for example, doping the polysilicon layer with impurities to reduce the resistance.

A pair of trenches 26 are provided on the second surface 30b of the first layered body 30. Each trench 26 extends annularly so as to surround the terminal 12B or 12D. The bottom surface of each trench 26 reaches the intermediate layer 16. Each trench 26 electrically insulates the terminal 12B or 12D from the first driving electrode 17. The region within each trench 26 may be an insulating material or an air gap.

A pair of trenches 27 and a pair of trenches 28 are provided on the third surface 40a of the second layered body 40. Each trench 27 extends in an annular shape so as to surround a connecting portion between the wiring portion 22 and the terminal 12A or 12C. Each trench 27 electrically insulates the second driving electrode 18 from the wiring portion 22. The trench 28 extends annularly along the inner edge of the second driving electrode 18. The trench 28 electrically insulates the second driving electrode 18 from a region inside the second driving electrode 18. The region within each trench 27 and 28 may be an insulating material or an air gap.

An anti-reflection layer 51, a third layered body 52, an intermediate layer 53, and a fourth layered body 54 are stacked in this order on a surface 14b of the substrate 14 on the light emitting side. The anti-reflection layer 51 and the intermediate layer 53 have the same configurations as those of the anti-reflection layer 15 and the intermediate layer 16, respectively. The third layered body 52 and the fourth layered body 54 each have a layered structure symmetrical to the second substrate 40 and the first layered body 30 with respect to the substrate 14. The anti-reflection layer 51, the third layered body 52, the intermediate layer 53, and the fourth layered body 54 constitute a stress-adjusting layer 50. The stress-adjusting layer 50 is disposed on the light emitting side of the substrate 14 and has a function of suppressing warpage of the substrate 14.

The stress adjustment layer 50 is provided with an opening 50a so as to overlap the light transmission region 11 when viewed from the facing direction D. The opening 50a has, for example, substantially the same diameter as the size of the light transmission region 11. The opening 50a is open to the light emitting side. The bottom surface of the opening 50a reaches the anti-reflection layer 51. A light shielding layer 29 is formed on the surface 50b of the stress adjustment layer 50 on the light emitting side. The light shielding layer 29 is made of, for example, a metal film such as aluminum or an alloy thereof.

In the Fabry-Perot interference filter 10 configured as described above, for example, when a voltage is applied between the first driving electrode 17 and the second driving electrode 18 via the first terminal 12A and the second terminal 12B, an electrostatic force corresponding to the voltage (potential difference) is generated between the first driving electrode 17 and the second driving electrode 18. The first mirror portion 31 is attracted toward the second mirror portion 41 fixed to the substrate 14 by the electrostatic force to adjust the distance between the first mirror portion 31 and the second mirror portion 41.

The wavelength of light transmitted through the Fabry-Perot interference filter 10 depends on the distance between the first mirror portion 31 and the second mirror portion 41 in the light transmission region 11. Therefore, by adjusting the voltage applied between the first driving electrode 17 and the second driving electrode 18, the wavelength of the transmitted light can be selected as appropriate. At this time, the compensation electrode 19 has the same potential as the first driving electrode 17. Therefore, the compensation electrode 19 functions to keep the first mirror portion 31 and the second mirror portion 41 flat in the light transmission region 11.

[Configuration of Spectroscopic Sensor]

Figure 4:
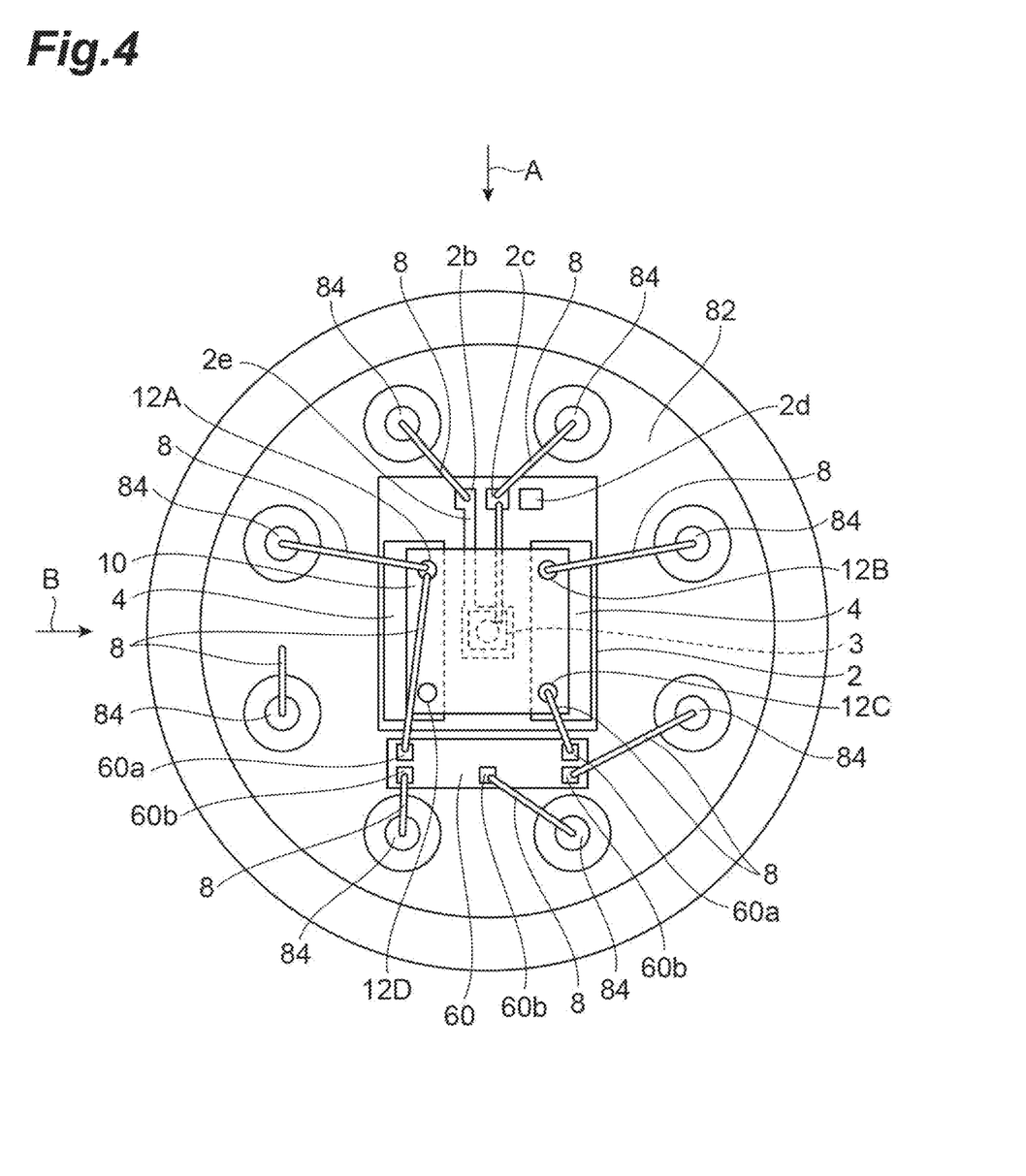
FIG. 4 is a plan view of the spectroscopic sensor.
Figure 5:
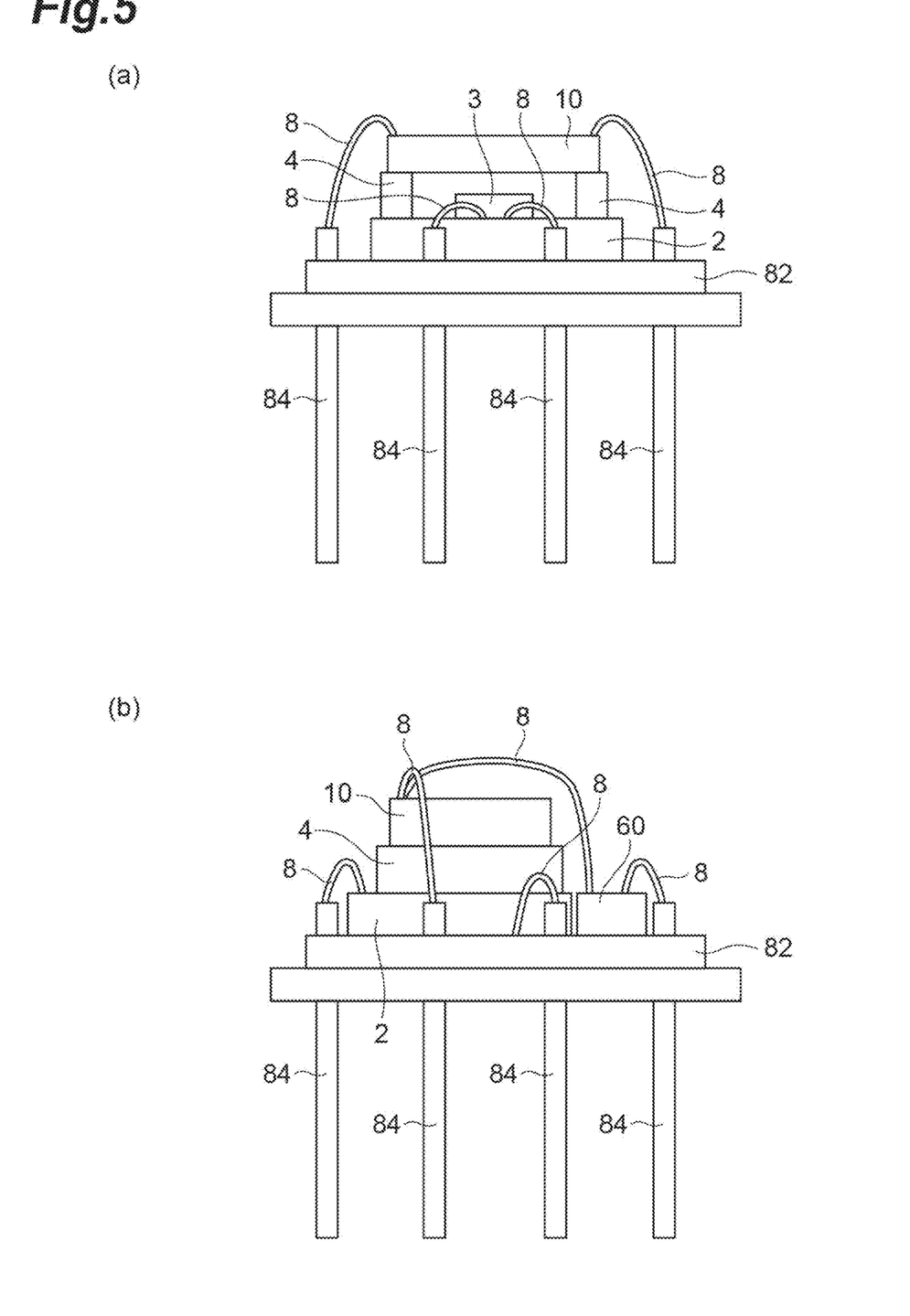
FIG. 5(a) is a side view of the spectroscopic sensor when viewed from the direction of arrow A in FIG. 4.
FIG. 5(b) is a side view of the spectroscopic sensor when viewed from the direction of arrow B in FIG. 4.

FIG. 4 is a plan view of the spectroscopic sensor 1. FIG. 5(a) is a side view of the spectroscopic sensor 1 when viewed from the direction of arrow A in FIG. 4, and FIG. 5(b) is a side view of the spectroscopic sensor 1 when viewed from the direction of arrow B in FIG. 4. In FIGS. 4 to 5(b), the cap 83 is not shown.

As shown in FIGS. 4 to 5(b), the spectroscopic sensor 1 further includes a resistance measurement unit 60. The resistance measurement unit 60 is electrically connected to the first terminal 12A and the third terminal 12C, and measures the resistance value of the first driving electrode 17. The resistance measurement unit 60 is, for example, a circuit for resistance measurement (resistance meter). The resistance measurement unit 60 measures the resistance value of the first driving electrode 17 by, for example, applying a voltage to the first driving electrode 17 and detecting a current flowing through the first driving electrode 17 during the application of the voltage. The resistance measurement unit 60 is disposed in the CAN package 81. The resistance measurement unit 60 is disposed on the stein 82, for example, and is located between the wiring substrate 2 and the lead pin 84.

The electrical connection of each part in the spectroscopic sensor 1 is as follows, for example. In this example, the stein 82 is provided with eight lead pins (external terminals) 84 arranged along the circumferential direction. The electrode pad 2b of the wiring substrate 2 is connected to the lead pin 84 via a wire (wiring) 8. Thus, the terminal on the back side of the photodetector 3 is connected to the lead pin 84. The electrode pad 2c of the wiring substrate 2 is connected to the lead pin 84 via the wire 8. Thus, the terminal on the front side of the photodetector 3 is connected to the lead pin 84. The lead pin 84 connected to the terminal on the front side of the photodetector 3 is adjacent to the lead pin 84 connected to the terminal on the back side of the photodetector 3.

The first terminal 12A is connected to a lead pin 84 (first external terminal) via a wire 8. The second terminal 12B is connected to a lead pin 84 (second external terminal) via a wire 8. The lead pin 84 to which the first terminal 12A is connected is located opposite to the lead pin 84 to which the second terminal 12B is connected with respect to the Fabry-Perot interference filter 10. The lead pin 84 to which the first terminal 12A is connected is adjacent to the lead pin 84 to which the terminal on the back side of the photodetector 3 is connected, and the lead pin 84 to which the second terminal 12B is connected is adjacent to the lead pin 84 to which the terminal on the front side of the photodetector 3 is connected. One of the plurality of lead pins 84 is connected to the stein 82 via a wire 8.

The resistance measurement unit 60 includes a pair of first electrodes 60a and a plurality of (three in this example) second electrodes 60b. One of the first electrodes 60a is connected to the first terminal 12A via a wire 8. The other of the first electrodes 60a is connected to the third terminal 12C via a wire 8. Accordingly, the resistance measurement unit 60 can input and output an electric signal to and from the first driving electrode 17 via the first terminal 12A and the third terminal 12C. Each of the plurality of second electrodes 60b is connected to a lead pin 84 via a wire 8. As a result, the resistance measurement unit 60 can input and output an electric signal to and from the outside, and can output a measurement result to the outside, for example.

Functions and Effects

Figure 6:
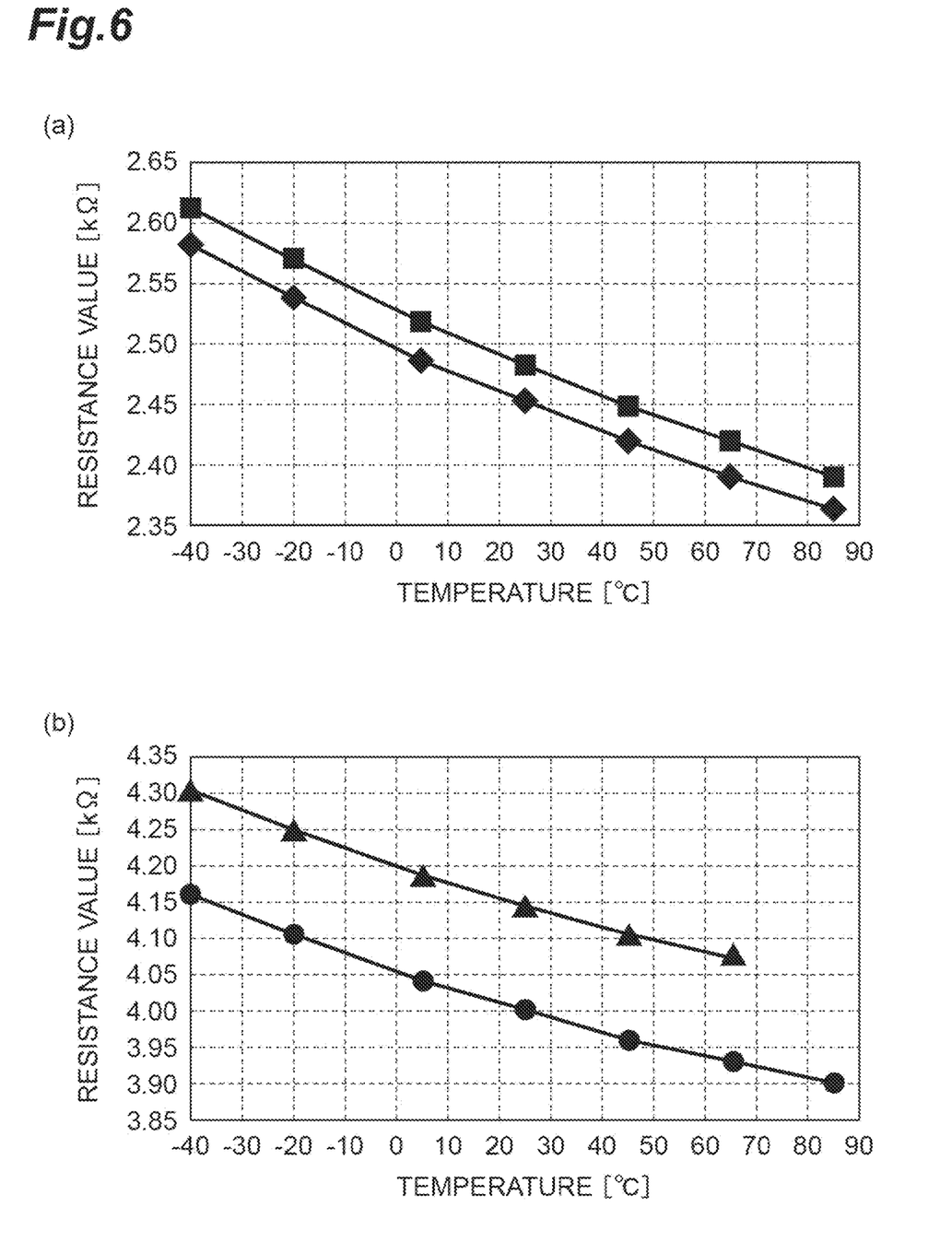
FIG. 6(a) is a graph showing the relationship between the temperature of the Fabry-Perot interference filter and the resistance value of the first driving electrode.
FIG. 6(b) is a graph showing the relationship between the temperature of the Fabry-Perot interference filter and the resistance value of the second driving electrode.

In the spectroscopic sensor 1, by applying a drive voltage between the first terminal 12A and the second terminal 12B via the lead pins 84, a potential difference is generated between the first driving electrode 17 and the second driving electrode 18, and the distance between the first mirror portion 31 and the second mirror portion 41 can be adjusted. In the spectroscopic sensor 1, the resistance value of the first driving electrode 17 provided in the first layered body 30 is measured by the resistance measurement unit 60. Since the resistance value of the first driving electrode 17 changes in accordance with the temperature, the temperature of the Fabry-Perot interference filter 10 can be detected (grasped) based on the measured resistance value. The detection of the temperature of the Fabry-Perot interference filter 10 based on the measured resistance value is performed by, for example, a control unit. The control unit can be configured by a computer including a processor (CPU), a RAM and a ROM which are recording medium, for example. The control unit may be provided in the spectroscopic sensor 1 or may be disposed outside the spectroscopic sensor 1. The control unit adjusts the drive voltage applied between the first driving electrode 17 and the second driving electrode 18 based on the detected temperature. This makes it possible to achieve high wavelength accuracy even when the environmental temperature changes. The adjustment of the driving voltage based on the detected temperature is performed, for example, before the driving of the Fabry-Perot interference filter 10 is started. The control unit may directly adjust the drive voltage based on the measured resistance value without detecting the temperature of the Fabry-Perot interference filter 10 based on the measured resistance value. Hereinafter, the relationship between the resistance values of the first driving electrode 17 and the second driving electrode 18 and the temperature will be described with reference to FIGS. 6 and 7.

FIG. 6(a) is a graph showing the relationship between the temperature of the Fabry-Perot interference filter 10 and the resistance value of the first driving electrode 17, and FIG. 6(b) is a graph showing the relationship between the temperature of the Fabry-Perot interference filter 10 and the resistance value of the second driving electrode 18. The two lines shown in each of FIGS. 6(a) and 6(b) show measurement results for different samples. The measurement was performed in a state where no driving voltage was applied between the first driving electrode 17 and the second driving electrode 18. The Fabry-Perot interference filter 10 was placed in a thermostatic chamber, and the set temperature of the thermostatic chamber was regarded as the temperature of the Fabry-Perot interference filter 10. It can be seen from FIG. 6(a) that there is a correspondence relationship between the temperature of the Fabry-Perot interference filter 10 and the resistance value of the first driving electrode 17. It can be seen from FIG. 6(b) that there is a correspondence relationship between the temperature of the Fabry-Perot interference filter 10 and the resistance value of the second driving electrode 18. That is, when the temperature of the Fabry-Perot interference filter 10 increases, the resistance values of the first driving electrode 17 and the second driving electrode 18 decrease, and when the temperature of the Fabry-Perot interference filter 10 decreases, the resistance values of the first driving electrode 17 and the second driving electrode 18 increase. Therefore, the temperature of the Fabry-Perot interference filter 10 can be grasped based on the resistance value of the first driving electrode 17 or the resistance value of the second driving electrode 18.

Figure 7:
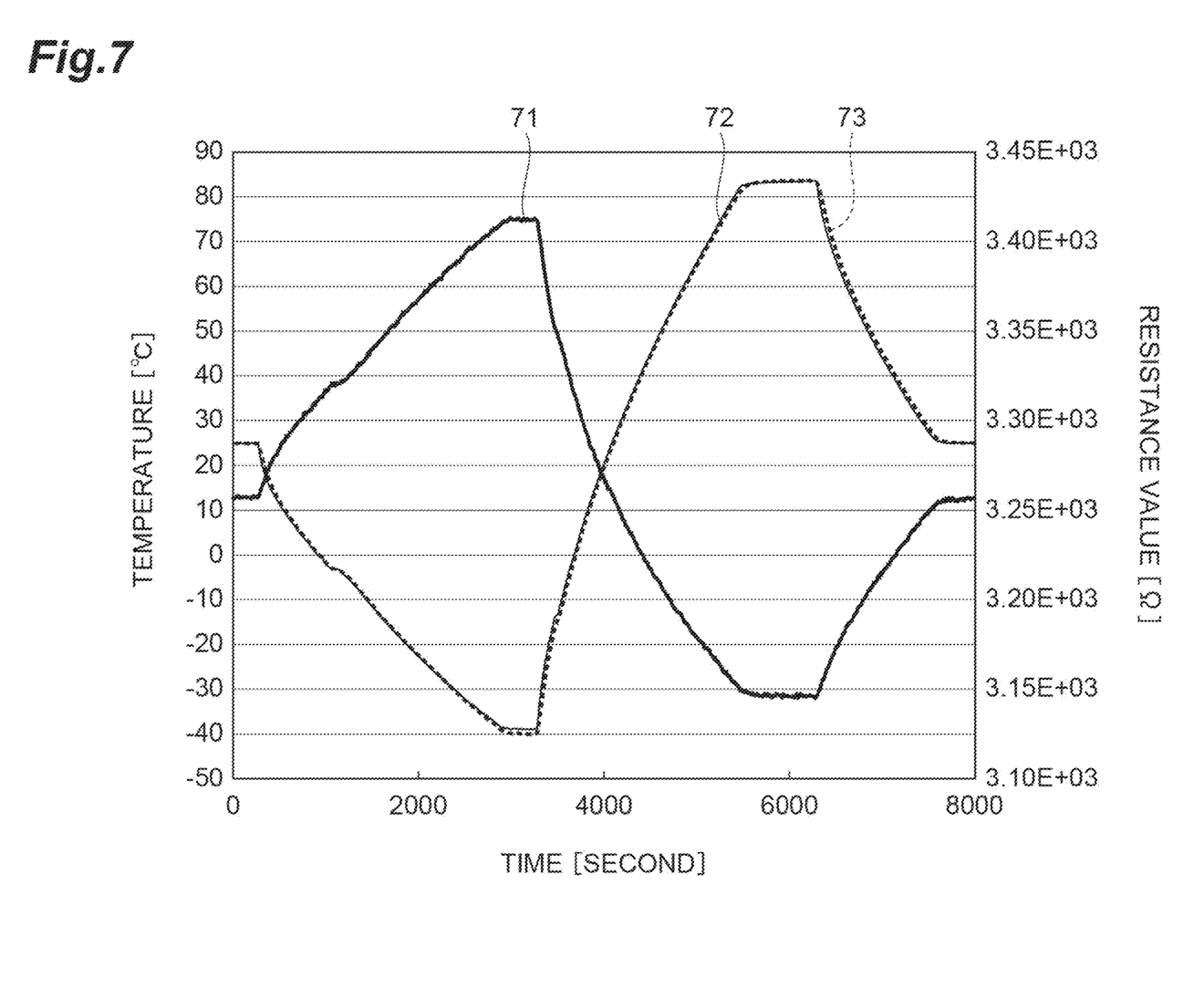
FIG. 7 is a graph showing the relationship between the temperature of the Fabry-Perot interference filter and the resistance value of the first driving electrode.

FIG. 7 is a graph showing the relationship between the temperature of the Fabry-Perot interference filter 10 and the resistance value of the first driving electrode 17. Reference numeral 71 denotes a temporal change in the resistance value of the first driving electrode 17. Reference numeral 72 denotes a temporal change in the environmental temperature of the Fabry-Perot interference filter 10. Here, the Fabry-Perot interference filter 10 is placed in a thermostatic chamber, and the temperature in the thermostatic chamber measured by a temperature monitor installed in the thermostatic chamber is set as the environmental temperature of the Fabry-Perot interference filter 10. Reference numeral 73 denotes a temporal change in the temperature detected by the thermister disposed on the wiring substrate 2. It can be seen from FIG. 7 that the temperature detected by the thermistor changes substantially equally to the environmental temperature. It can also be seen that the change in the resistance value of the first driving electrode 17 corresponds to the change in the environmental temperature. That is, when the environmental temperature increases, the resistance value of the first driving electrode 17 decreases, and when the environmental temperature decreases, the resistance value of the first driving electrode 17 increases. Therefore, based on the resistance value of the first driving electrode 17, the temperature of the Fabry-Perot interference filter 10 can be grasped as accurately as in the case of using the thermistor.

Furthermore, in the spectroscopic sensor 1, the first driving electrode 17 overlaps the air gap S when viewed from the facing direction D, and the distance between the first driving electrode 17 and the air gap S in the facing direction D is shorter than the distance between the second surface 30b and the air gap S in the facing direction D. The transmission wavelength of the Fabry-Perot interference filter 10 is determined by the thickness of the air gap S (in other words, the distance between the first mirror portion 31 and the second mirror portion 41). Therefore, the temperature of the Fabry-Perot interference filter 10 can be accurately grasped by using the resistance value of the first driving electrode 17 disposed near the air gap S. Further, in the spectroscopic sensor 1, since the temperature of the Fabry-Perot interference filter 10 can be grasped based on the resistance value of the first driving electrode 17, it is not necessary to provide a temperature sensor, wiring thereof, and the like as in the related art described above. As a result, it is possible to reduce the size of the Fabry-Perot interference filter 10 and to reduce the cost. Therefore, according to the spectroscopic sensor 1, the temperature of the Fabry-Perot interference filter 10 can be accurately grasped, and the size of the Fabry-Perot interference filter 10 can be reduced. Further, since the first driving electrode 17 has a heat capacity smaller than that of the thermistor used in the related art described above, the thermal response is fast. Therefore, in the spectroscopic sensor 1, the accurate temperature can be grasped in a short time, and the adjustment of the driving voltage based on the temperature can be accurately performed.

In the spectroscopic sensor 1, the first driving electrode 17 is an impurity region in the polysilicon layer constituting the first layered body 30. Accordingly, since the first driving electrode 17 is configured by the semiconductor layer in which the change of the resistance value in accordance with the temperature is large, it is possible to more accurately grasp the temperature of the Fabry-Perot interference filter 10. Furthermore, the degree of freedom in design for changing at least one of the arrangement and characteristics of the first driving electrodes 17 can be improved.

In the spectroscopic sensor 1, the first driving electrode 17 overlaps the light transmission region 11 when viewed from the facing direction D, and forms the first mirror portion 31. As a result, the first driving electrode 17 can be disposed near the air gap S between the first mirror portion 31 and the second mirror portion 41, and the temperature of the Fabry-Perot interference filter 10 can be more accurately grasped.

In the spectroscopic sensor 1, the first driving electrode 17 is exposed to the air gap S. As a result, the first driving electrode 17 can be disposed closer to the air gap S, and the temperature of the Fabry-Perot interference filter 10 can be grasped more accurately.

In the spectroscopic sensor 1, the first terminal 12A and the third terminal 12C are provided in the first layered body 30 so as to face each other with the light transmission region 11 interposed therebetween when viewed from the facing direction D. Accordingly, the distance between the first terminal 12A and the third terminal 12C via the first driving electrode 17 can be increased, and the change in the resistance value of the first driving electrode 17 in accordance with the temperature can be increased. As a result, the temperature of the Fabry-Perot interference filter 10 can be grasped more accurately.

In the spectroscopic sensor 1, the first mirror portion 31 is a movable mirror that is movable with respect to the second mirror portion 41, and the second mirror portion 41 is a fixed mirror whose position is fixed. Thus, the temperature of the Fabry-Perot interference filter 10 can be more accurately grasped.

In the spectroscopic sensor 1, the resistance measurement unit 60 is disposed in the CAN package 81. Thus, the size of the spectroscopic sensor 1 can be reduced. The Fabry-Perot interference filter 10 is fixed to the stein 82 in a state of being separated from the stein 82. Accordingly, it is possible to suppress the influence of heat on the Fabry-Perot interference filter 10 via the stein 82.

In the spectroscopic sensor 1, both the first driving electrode 17 and the compensation electrode 19 are exposed to the air gap S. Thus, the temperature of the Fabry-Perot interference filter 10 can be more accurately grasped. The spectroscopic sensor 1 includes a lead pin 84 (first external terminal) electrically connected to the first terminal 12A and a lead pin 84 (second external terminal) electrically connected to the second terminal 12B. Thus, by applying a drive voltage between the lead pins 84 and, an electrostatic force can be generated between the first driving electrode 17 and the second driving electrode 18.

Modification

Figure 8:
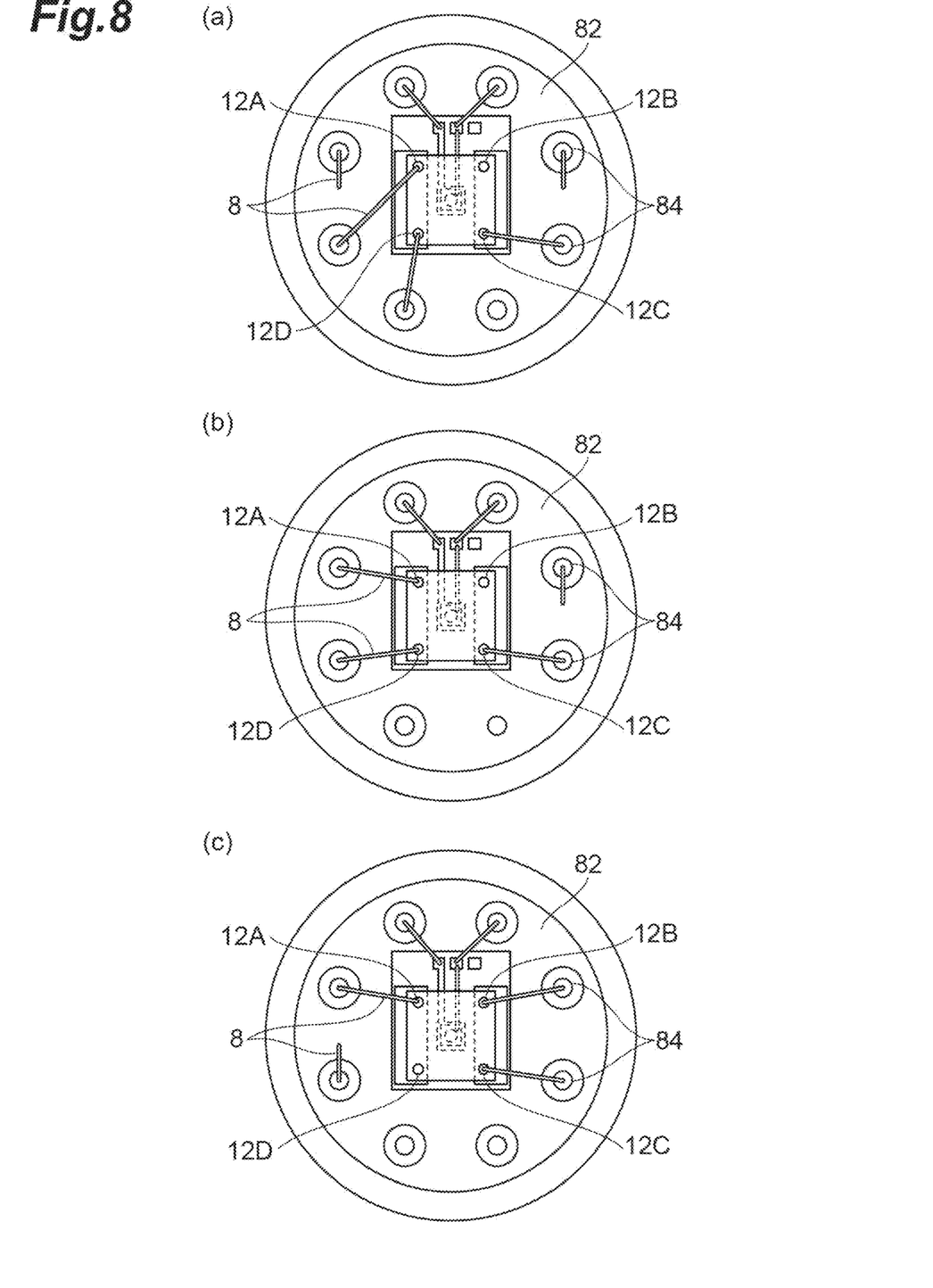
FIG. 8(a) is a plan view of a spectroscopic sensor according to a first modification.
FIG. 8(b) is a plan view of a spectroscopic sensor according to a second modification.
FIG. 8(c) is a plan view of a spectroscopic sensor according to a third modification.

The present disclosure is not limited to the above embodiment. For example, the spectroscopic sensor 1 may be configured as in the first to third modifications shown in FIGS. 8(*a*) to 8(*c*). In the first to third modifications, the resistance measurement unit 60 is disposed outside the CAN package 81.

The electrical connection of each part in the first modification is as follows, for example. The first terminal 12A is connected to a lead pin 84 (first external terminal) via a wire 8. The second terminal 12B is not connected to the lead pins 84, and the fourth terminal 12D is connected to a lead pin 84 (second external terminal) via the wire 8. In this case, the fourth terminal 12D can be regarded as the second terminal. The third terminal 12C is connected to a lead pin 84 (third external terminal) via a wire 8. Two of the plurality of lead pins 84 are connected to the stein 82 via wires 8. The lead pins 84 connected to the first terminal 12A and the third terminal 12C are connected to the resistance measurement unit 60 outside the CAN package 81. The lead pin 84 connected to the stein 82 is located between the lead pin 84 connected to the first terminal 12A and the lead pin 84 connected to the terminal on the back side of the photodetector 3, and the lead pin 84 connected to the stein 82 is located between the lead pin 84 connected to the third terminal 12C and the lead pin 84 connected to the terminal on the front side of the photodetector 3. Thus, the lead pin 84 connected to the photodetector 3 can be disposed away from the lead pins 84 connected to the first terminal 12A and the third terminal 12C. As a result, it is possible to suppress a situation in which noise is generated in the output signal from the photodetector 3 due to dirt or the like on the stein 82.

In the first modification, by applying a drive voltage between the first terminal 12A and the second terminal 12D via the lead pins 84, a potential difference is generated between the first driving electrode 17 and the fourth driving electrode 18, and the distance between the first mirror portion 31 and the second mirror portion 41 can be adjusted. The resistance value of the first driving electrode 17 can be measured via the lead pins 84, the first terminal 12A, and the third terminal 12C. Therefore, similarly to the above-described embodiment, the temperature of the Fabry-Perot interference filter 10 can be accurately grasped, and the Fabry-Perot interference filter 10 can be downsized. Furthermore, since the resistance measuring unit 60 is disposed outside the CAN package 81, the CAN package 81 can be downsized.

In the second modification, the lead pin 84 to which the first terminal 12A is connected is adjacent to the lead pin 84 to which the terminal on the back side of the photodetector 3 is connected. In the third modification, the lead pin 84 to which the first terminal 12A is connected is adjacent to the lead pin 84 to which the terminal on the back side of the photodetector 3 is connected, and the lead pin 84 to which the second terminal 12B is connected is adjacent to the lead pin 84 to which the terminal on the front side of the photodetector 3 is connected. According to the second modification and the third modification, similarly to the above-described embodiment, it is possible to accurately grasp the temperature of the Fabry-Perot interference filter 10, and to downsize the Fabry-Perot interference filter 10.

In the above embodiment and the first to third modifications, the configuration of the spectroscopic sensor 1 is not limited to the illustrated example. For example, the connection position of the wire 8, the number, arrangement, and use of the lead pins 84, the shapes of the CAN package 81 and the wiring substrate 2, the shape and arrangement of the electrode pad in the wiring substrate 2, the connection manner of the photodetector 3 to the lead pins 84, the shape and arrangement of the resistance measurement unit 60, and the angle and arrangement of the Fabry-Perot interference filter 10 and the wiring substrate 2 to the stein 82 are not limited to the illustrated example. The plurality of lead pins 84 may not include the lead pin 84 connected to the stein 82 via the wire 8. The plurality of lead pins 84 may include a lead pin 84 directly connected to the stein 82. In the embodiment and the first to third modifications, the lead pin 84 not connected to any element may be omitted.

The resistance measurement unit 60 may measure the resistance value of the first driving electrode 17 by applying a current (for example, a fixed current of about 1 mA) to the first driving electrode 17 and detecting the voltage applied to the first driving electrode 17 during the application of the current, instead of detecting the current flowing through the first driving electrode 17 during the application of the voltage. Such a configuration is particularly effective when current leakage occurs between the first driving electrode 17 and the second driving electrode 18.

In the above-described embodiment, the resistance measurement unit 60 is electrically connected to the first terminal 12A and the third terminal 12C and measures the resistance value of the first driving electrode 17. Alternatively or additionally, the resistance measurement unit 60 may be electrically connected to the second terminal 12B and the fourth terminal 12D and measure the resistance value of the second driving electrode 18. As described above with reference to FIG. 6(*b*), in this case, the temperature of the Fabry-Perot interference filter 10 can be grasped based on the resistance value of the second driving electrode 18. In this case, the first layered body 30, the second layered body 40, the first mirror portion 31, the second mirror portion 41, the first driving electrode 17, the second driving electrode 18, the first terminal 12A, the second terminal 12B, and the fourth terminal 12D can be regarded to correspond to the second structural body, the first structural body, the second mirror portion, the first mirror portion, the second driving electrode, the first driving electrode, the second terminal, the first terminal, and the third terminal, respectively, and the resistance measuring unit 60 can be regarded as measuring the resistance value of the first driving electrode. In this case, the first mirror portion is a fixed mirror, and the second mirror portion is a movable mirror. That is, it is sufficient that the relative distance between the first mirror portion and the second mirror portion is adjustable, and either the first mirror portion or the second mirror portion may be a movable mirror. When the resistance value of the second driving electrode 18 is measured in the first modification, for example, the second terminal 12B is connected to the lead pin 84. When the resistance value of the first driving electrode 17 is not measured, only one of the first terminal 12A and the third terminal 12C may be connected to the lead pin 84.

In the above-described embodiment, the first driving electrode 17 may not constitute the first mirror portion 31. The first driving electrode 17 may be disposed so as to surround the light transmission region 11. The first driving electrode 17 may be a metallic film disposed on the first surface 30a of the first layered body 30 (first structural body). Similarly, the second driving electrode 18 may be a metallic film disposed on the third surface 40a of the second layered body 40 (second structural body). In this case, the first structural body and the second structural body may not be a layered body, and may be substrate, for example. In the above embodiment, the electrostatic force is generated between the first driving electrode 17 and the second driving electrode 18 by applying the voltage, but the electrostatic force may be generated between the first driving electrode 17 and the second driving electrode 18 by applying the current.

The first driving electrode 17 may have a portion that does not overlap the air gap S when viewed from the facing direction D, and at least a portion of the first driving electrode 17 may overlap the air gap S when viewed from the facing direction D. The first driving electrode 17 may be formed in an intermediate layer (polysilicon layer) among the plurality of layers constituting the first layered body 30 and may not be exposed to the air gap S. The second driving electrode 18 may be formed in an intermediate layer (polysilicon layer) among the plurality of layers constituting the second layered body 40 and may not be exposed to the air gap S. Another layer may be disposed between the first mirror portion 31 and the second mirror portion 41. That is, the expression "certain elements face each other via an air gap" includes not only a case where the elements directly face each other but also a case where the elements face each other via the air gap S in a state where another layer is disposed therebetween. The first driving electrode 17 and the compensation electrode 19 may be connected in parallel between the first terminal 12A and the third terminal 12C. The substrate 14 and/or the compensation electrode 19 may be omitted. The photodetector 3 may be disposed outside the CAN package 81. In this case, for example, a light emitting unit may be provided in the CAN package 81, and light emitted from the light emitting unit may be detected by the photodetector 3. In this case, the configuration obtained by removing the photodetector 3 from the spectroscopic sensor 1 can be regarded as an optical filter device.

REFERENCE SIGNS LIST

1: spectroscopic sensor (optical filter device), 3: photodetector, 10: Fabry-Perot interference filter, 12A: first terminal, 12B: second terminal, 12C: third terminal, 17: first driving electrode, 18: second driving electrode, 30: first layered body (first structural body), 30a: first surface, 30b: second surface, 31: first mirror portion, 40: second layered body (second structural body), 40a: third surface, 41: second mirror portion, 60: resistance measurement unit, 81: CAN package, 82: stein, 83: cap, 84: lead pin (first external terminal, second external terminal, third external terminal), 89: light incidence portion, D: facing direction, S: air gap.

The invention claimed is:

1. An optical filter device comprising:
a Fabry-Perot interference filter; and
a resistance measurement unit electrically connected to the Fabry-Perot interference filter,
wherein the Fabry-Perot interference filter comprises:
a first structural body having a first surface and a second surface opposite the first surface;
a second structural body having a third surface facing the first surface via an air gap;
a first mirror portion provided to the first structural body;
a second mirror portion provided to the second structural body so as to face the first mirror portion via the air gap, a distance between the first mirror portion and the second mirror portion in a light transmission region being adjusted;
a first driving electrode provided to the first structural body;
a second driving electrode provided to the second structural body so as to face the first driving electrode via the air gap;
a first terminal electrically connected to the first driving electrode;
a second terminal electrically connected to the second driving electrode; and
a third terminal electrically connected to the first driving electrode,
wherein the first driving electrode is a unitary electrode that overlaps the air gap when viewed from a facing direction in which the first surface and the third surface face each other,
a distance between the first driving electrode and the air gap in the facing direction is shorter than a distance between the second surface and the air gap in the facing direction,
the resistance measurement unit is electrically connected to the first terminal and the third terminal and measures a resistance value of the first driving electrode,
the first terminal and the third terminal are separately connected to the first driving electrode, and
the resistance measurement unit is apart from the Fabry-Perot interference filter.

2. The optical filter device according to claim 1, wherein the first structural body is a layered body, and the first driving electrode is an impurity region in a semiconductor layer constituting the layered body.

3. The optical filter device according to claim 2, wherein the first driving electrode overlaps the light transmission region when viewed from the facing direction, and forms the first mirror portion.

4. The optical filter device according to claim 1, wherein the first driving electrode is exposed to the air gap.

5. The optical filter device according to claim 1, wherein the first terminal and the third terminal are provided to the first structural body so as to face each other with the light transmission region interposed therebetween when viewed from the facing direction.

6. The optical filter device according to claim 1, wherein the first mirror portion is a movable mirror that is movable with respect to the second mirror portion, and the second mirror portion is a fixed mirror whose position is fixed.

7. The optical filter device according to claim 1, further comprising a package accommodating the Fabry-Perot interference filter,
wherein the resistance measurement unit is disposed in the package.

8. The optical filter device according to claim 1, further comprising a package accommodating the Fabry-Perot interference filter,
wherein the package includes a stem and a cap provided with a light incident portion, and
the Fabry-Perot interference filter is fixed to the stem in a state of being spaced apart from the stem.

9. The optical filter device according to claim 1, further comprising: a first external terminal electrically connected to the first terminal; and a second external terminal electrically connected to the second terminal.

10. An optical filter device comprising:
a Fabry-Perot interference filter; and
a first external terminal, a second external terminal, and a third external terminal electrically connected to the Fabry-Perot interference filter,
wherein the Fabry-Perot interference filter comprises:
a first structural body having a first surface and a second surface opposite the first surface;
a second structural body having a third surface facing the first surface via an air gap;
a first mirror portion provided to the first structural body;
a second mirror portion provided to the second structural body so as to face the first mirror portion via the air gap, a distance between the first mirror portion and the second mirror portion in a light transmission region being adjusted;
a first driving electrode provided to the first structural body;
a second driving electrode provided to the second structural body so as to face the first driving electrode via the air gap;
a first terminal electrically connected to the first driving electrode;
a second terminal electrically connected to the second driving electrode; and
a third terminal electrically connected to the first driving electrode,
wherein the first driving electrode is a unitary electrode that overlaps the air gap when viewed from a facing direction in which the first surface and the third surface face each other,
a distance between the first driving electrode and the air gap in the facing direction is shorter than a distance between the second surface and the air gap in the facing direction,
the first terminal and the third terminal are separately connected to the first driving electrode,
the first external terminal is electrically connected to the first terminal,
the second external terminal is electrically connected to the second terminal,
the third external terminal is electrically connected to the third terminal,
the first external terminal, the second external terminal, and the third external terminal are located apart from the Fabry-Perot interference filter,
a resistance measurement unit is electrically connected to the first external terminal and the third external terminal and measures a resistance value of the first driving electrode via the first terminal and the third terminal,
a package accommodates the Fabry-Perot interference filter, and
the resistance measurement unit is disposed outside the package.

11. The optical filter device according to claim 10,
wherein the first structural body is a layered body, and
the first driving electrode is an impurity region in a semiconductor layer constituting the layered body.

12. The optical filter device according to claim 11,
wherein the first driving electrode overlaps the light transmission region when viewed from the facing direction, and forms the first mirror portion.

13. The optical filter device according to claim 10,
wherein the first driving electrode is exposed to the air gap.

14. The optical filter device according to claim 10,
wherein the first terminal and the third terminal are provided to the first structural body so as to face each other with the light transmission region interposed therebetween when viewed from the facing direction.

15. The optical filter device according to claim 10,
wherein the first mirror portion is a movable mirror that is movable with respect to the second mirror portion, and
the second mirror portion is a fixed mirror whose position is fixed.

16. The optical filter device according to claim 10,
wherein the package includes a stem and a cap provided with a light incident portion, and
the Fabry-Perot interference filter is fixed to the stem in a state of being spaced apart from the stem.

17. A method for controlling an optical filter device including a Fabry-Perot interference filter, the Fabry-Perot interference filter comprising:
a first structural body having a first surface and a second surface opposite the first surface;
a second structural body having a third surface facing the first surface via an air gap;
a first mirror portion provided to the first structural body;
a second mirror portion provided to the second structural body so as to face the first mirror portion via the air gap, a distance between the first mirror portion and the second mirror portion in a light transmission region being adjusted;
a first driving electrode provided to the first structural body;
a second driving electrode provided to the second structural body so as to face the first driving electrode via the air gap;
a first terminal electrically connected to the first driving electrode;
a second terminal electrically connected to the second driving electrode; and
a third terminal electrically connected to the first driving electrode
wherein the first driving electrode is a unitary electrode that overlaps the air gap when viewed from a facing direction in which the first surface and the third surface face each other,
a distance between the first driving electrode and the air gap in the facing direction is shorter than a distance between the second surface and the air gap in the facing direction, and
the first terminal and the third terminal are separately connected to the first driving electrode,
the method for controlling the optical filter device comprising:
a first step of measuring a resistance value of the first driving electrode via the first terminal and the third terminal with a resistance measurement unit that is apart from the Fabry-Perot interference filter; and
a second step of adjusting a voltage or a current applied between the first terminal and the second terminal based on the resistance value measured in the first step.

* * * * *